United States Patent [19]

Adkins

[11] Patent Number: 4,822,830

[45] Date of Patent: Apr. 18, 1989

[54] ORGANOPOLYSILOXANE ELASTOMERS HAVING IMPROVED ELECTRICAL PROPERTIES AND INSULATORS COATED THEREWITH

[75] Inventor: James R. Adkins, Adrian, Mich.

[73] Assignee: Wacker Silicones Corporation, Adrian, Mich.

[21] Appl. No.: 118,125

[22] Filed: Nov. 9, 1987

[51] Int. Cl.$^4$ .................... C08K 9/06; C08L 83/08
[52] U.S. Cl. .................... 523/203; 523/212; 523/213; 524/786; 524/864; 427/341
[58] Field of Search ............ 523/203, 213, 212; 524/864, 786; 427/341

[56] References Cited

U.S. PATENT DOCUMENTS

| | | | |
|---|---|---|---|
| 3,647,742 | 3/1972 | Stevens | 523/213 |
| 3,965,065 | 6/1976 | Elliott | 524/430 |
| 4,136,080 | 1/1979 | Berger | 523/203 |
| 4,162,245 | 7/1979 | Collins | 523/213 |
| 4,221,896 | 9/1980 | Endo | 523/213 |
| 4,317,762 | 3/1982 | Kratel | 523/203 |
| 4,447,576 | 5/1984 | Fukayama | 524/864 |
| 4,477,606 | 10/1984 | Fukayama | 523/213 |
| 4,514,231 | 4/1985 | Kerner | 523/213 |
| 4,711,673 | 12/1987 | Musselman | 523/213 |

*Primary Examiner*—C. Warren Ivy

[57] ABSTRACT

Organopolysiloxanes having improved electrical properties, which comprises mixing an organopolysiloxane having reactive groups with an amine-containing organosilicon compound, which is capable of crosslinking with the organopolysiloxane and a treated alumina trihydrate and thereafter exposing the resultant composition to atmospheric moisture. The resultant composition may be dispersed in an organic solvent and applied to electrical insulators.

16 Claims, No Drawings

ORGANOPOLYSILOXANE ELASTOMERS HAVING IMPROVED ELECTRICAL PROPERTIES AND INSULATORS COATED THEREWITH

The present invention relates to organopolysiloxane elastomers having improved electrical properties and more particularly to organopolysiloxane compositions which may be applied to electrical insulators to provide improved arc resistance.

BACKGROUND OF THE INVENTION

Various compositions have been described heretofore having improved electrical properties. For example, U.S. Pat. No. 3,965,065 to Elliott describes a method for preparing a composition having improved electrical properties which comprises heating a mixture containing aluminum hydrate and an organopolysiloxane which is convertible to an elastomeric solid to a temperature above 100° C. for at least thirty (30) minutes.

Niemi describes a method for preparing improved high voltage insulators in U.S. Pat. No. 4,476,155 in which a composition containing the product obtained by mixing a hydroxyl endblocked polydimethylsiloxane with aluminum hydroxide and a ketoxime functional silane, is applied to the outer surface of an insulator.

Penneck discloses high voltage insulating materials in U.S. Pat. No. 4,001,128 in which the insulating materials contain organic synthetic polymeric materials and an antitracking filler system containing at least 20 percent by weight of alumina trihydrate and at least one percent by weight based on the weight of the polymer and filler system of a chemically treated silica filler.

Penneck discloses tracking resistant insulating materials in U.S. Pat. No. 4,189,392, in which the insulating materials contain a polymeric material and an anti-tracking filler and a fluorine substituted compound which is a hydrophobic, non-ionic compound having a fluorine-substituted aliphatic carbon chain linked to a group having an affinity for the polymeric material and/or the anti-tracking filler.

It is an object of the present invention to provide an organopolysiloxane elastomer having improved adhesion. Another object of the present invention is to provide an organopolysiloxane having an improved contact angle. Still another object of the present invention is to provide an organopolysiloxane having an accelerated cure rate. Still another object of the present invention is to provide an organopolysiloxane elastomer having improved arc resistance. Still another object of the present invention is to provide an organopolysiloxane elastomer which exhibits improved resistance to leakage of electrical current. Still another object of the present invention is to provide a composition which may be applied to the outer surface of insulators to reduce electrical leakage. A further object of the present invention is to provide coated insulators having a longer useful life. A still further object of the present invention is to provide coated insulators which are resistant to arcing.

SUMMARY OF THE INVENTION

The foregoing objects and others which are apparent from the following description are accomplished in accordance with this invention, generally speaking, by providing a composition comprising an organopolysiloxane containing reactive groups, an amine crosslinking agent which is capable of crosslinking with the organopolysiloxane and alumina trihydrate, which has been treated to impart hydrophobic properties thereto. The resultant composition may be applied to the outer surface of electrical insulators and crosslinked in the presence of atmospheric moisture.

DESCRIPTION OF THE INVENTION

The organopolysiloxanes employed herein are preferably diorganopolysiloxanes having terminal reactive groups and more preferably organopolysiloxanes having terminal hydroxyl groups. These organopolysiloxanes are well known and have been employed heretofore in room temperature vulcanizable (RTV) compositions. The preferred diorganopolysiloxanes, which have terminal hydroxyl groups, may be represented by the formula

where each R is a monovalent hydrocarbon radical or a substituted monovalent hydrocarbon radical, x has an average value of from 0.99 to 1.01, has an average value of from 1.99 to 2.01, x +y is equal to 3, n is a number of at least 3 and preferably at least 50.

The hydroxyl groups linked to the silicon atoms of the oranopolysiloxane can be replaced in part or entirely by other reactive groups such as hydrogen atoms, halogen atoms, alkoxy groups, aryloxy radicals and radicals of the formula R'NH—, where R' is a cycloalkyl radical of from 5 to 12 carbon atoms.

The siloxane polymers are essentially linear, hence they are predominately, i.e., at least 90 mole percent are $R_2SiO$ units. However, siloxane units, other than the disiloxane ($R_2SiO$) units may be present in an amount up to about 5 mol percent and more preferably below about 2 mol percent. Generally, siloxane units such as $RSiO_{3/2}$ units, $R_3SiO_{1/2}$ units and/or $SiO_{4/2}$ units, where R is the same as above can be present mostly as impurities.

In the above formula, each R can be a monovalent hydrocarbon radical of up to 18 carbon atoms. Examples of radicals represented by R include alkyl radicals such as the methyl, ethyl, n-propyl, isopropyl, dodecyl and octadecyl radicals; alkenyl radicals such as vinyl, allyl, hexenyl and octadecenyl radicals; cycloalkyl radicals such as the cyclobutyl, cyclopentyl, cyclohexyl and cyclodecyl radicals; cycloalkenyl radicals such as the cyclobutenyl, cyclopentenyl, cyclohexenyl and cyclodecenyl radicals; aryl radicals such as phenyl, xenyl, naphthyl and the phenanthryl radicals; aralkyl radicals such as the benzyl, B-phenylethyl and Bphenylpropyl radicals and alkaryl radicals such as the tolyl, xylyl and ethylphenyl radicals.

Substituted hydrocarbon radicals represented by R include halogen hydrocarbon radicals such as o-, m- and p-chlorophenyl and bromophenyl radicals, α,α,α-trifluorotolyl, 3,3,3-trifluoropropyl, chloro-, fluoro- and bromo-derivatives of the various hydrocarbon radicals set forth above as well as cyanoalkyl radicals such as B-cyanoethyl, cyanopropyl, cyano-n-butyl, cyano-n-propyl and omega-cyanooctadecyl radicals.

Preferably, the radicals represented by R have less than 8 carbon atoms and more preferably R represents methyl, ethyl, propyl, vinyl, phenyl, and 3,3,3-trifluoropropyl radicals. Of course, as is usually the case, the R radicals on a single silicon atom can be the same or different and various units in the siloxane chain can be the same or different homopolymers, e.g., dimethylsiloxane units, copolymers of, for example, dimethylsiloxane and methylvinylsiloxane units, or phenylmethylsiloxane units and mixtures thereof. The siloxane polymers employed can vary from relatively mobile fluids (viscosity 50 mPa.s at 25° C.) to gum-like materials having viscosities in the range of $10^6$ mPa.s at 25° C. This can be seen from the value of n in the general formula above, where n is at least 3 and is preferably at least 50, but can have a value as high as 2,000,000. The preferred siloxane polymers are those having viscosities in the range of from 200 to 200,000 mPa.s at 25° C.

These siloxanes are known and have been described in, for example, U.S. Pat. Nos. 3,294,732; 3,127,363; 3,105,061 and others.

The room temperature vulcanizable organopolysiloxane compositions are prepared by mixing under anhydrous conditions organopolysiloxanes containing reactive groups, preferably hydroxyl groups, with an amine-substituted silicon compound capable of reacting with the organopolysiloxane reactive groups and having an average of at least two $-NR_2^1$ groups bonded to a silicon atom per molecule, where $R^1$ is a monovalent hydrocarbon radical or hydrogen, and more preferably at least one $R^1$ is hydrogen.

Amine-substituted silicon compounds which may be employed as crosslinking agents are aminosilanes of the formula $R^2{}_{4-z}Si(NR^1)_z$ where $R^1$ is the same as above and $R^2$ is a monovalent radical having from 1 to 18 carbon atoms, and z has an average value of at least 2 and more preferably from 2 to 4 per molecule and partial hydrolyzates thereof.

The aminosilanes which are employed as crosslinking agents may contain an average of 3 or 4 amino substitutents per silicon atom and 0 or 1 alkyl, or aryl, or alkaryl or aralkyl radicals per silicon atom. In general, the trifunctional aminosilanes may be represented by the formula $R^2Si(NR_2^1)_3$ and the tetra-functional silanes by the formula $Si(NR_2^1)_4$, where $R^1$ and $R^2$ are the same as above. Specific examples of monovalent hydrocarbon radicals represented by $R^1$ are alkyl radicals, such as the methyl, ethyl, propyl or octadecyl radicals, aryl radicals, such as the phenyl or anthracyl or a cycloalkyl radical such as the cyclohexyl radical or an aralkyl radical such as the benzyl or phenylethyl radical or an alkaryl radical such as the tolyl or xylyl radicals. Examples of monovalent hydrocarbon radicals represented by $R^2$ are an alkyl, aryl, cycloalkyl, alkaryl or aralkyl radicals. The specific examples recited for the $R^1$ radicals also apply to the $R^2$ radicals, when $R^1$ is a monovalent hydrocarbon radical. Only one type of aminosilane need be employed; however, mixtures of aminosilanes may also be employed as crosslinking agents.

Other amino-substituted silicon compounds which may be employed as cross-linking agents are aminosiloxanes having the general formulas

and aminosilylalkanes having the general formula

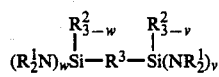

where R, $R^1$ and $R^2$ are the same as above, $R^3$ is a saturated or unsaturated divalent hydrocarbon radical having up to 10 carbon atoms, m is a number of from 0 to 50, v is a number of from 0 to 3, w is a number of from 0 to 3 and the sum of v+w is equal to at least 3.

Divalent saturated hydrocarbon radicals represented by $R^3$ above are methylene, ethylene, propylene, butylene, hexylene, octylene and decylene radicals. Divalent unsaturated hydrocarbon radicals represented by $R^3$ are ethenylene, propenylene, butenylene, hexenylene, octenylene and decenylene radicals. An example of a divalent cyclic hydrocarbon radical is the phenylene radical.

The aminosilanes and aminosiloxanes and aminosilylalkanes employed as crosslinking agents are described, for example, in U.S. Pat. Nos. 3,408,325 to Hittmair et al; 3,464,951 to Hittmair et al; 3,452,964 to Creamer; 3,644,434 to Hittmair et al; and 3,816,164 to Pepe et al, all of which are incorporated herein by reference.

Other amine-substituted silicon compounds which may be employed as cross-linking agents in the compositions of this invention may be represented by the formula $R_{4-z}^2Si[NHCH(R^4)_2]_z$ where $R^2$ and z are the same as above, $R^4$ which may be the same or different represent monovalent hydrocarbon radicals having from 1 to 18 carbon atoms, preferably from 1 to 10 carbon atoms, and more preferably from 1 to 4 carbon atoms. Preferably, $R^4$ is an alkyl radical, such as the methyl, ethyl, propyl, isopropyl, butyl, octyl, decyl and octadecyl radicals. Other radicals represented by $R^4$ are aryl radicals such as the phenyl radical, alkaryl radicals such as the tolyl and ethylphenyl radicals and aralkyl radicals such as the benzyl and the B-phenylethyl radicals.

Examples of crosslinking agents represented by the above formula are silanes of the formula

and silazanes of the general formula

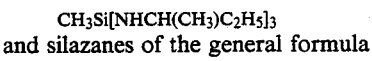
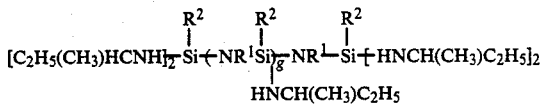

where $R^1$, $R^2$ and g is 0 or a number having a value of at least 1 and preferably less than about 100.

Other silicon compounds which can be used as crosslinking agents are aminosiloxanes of the formula

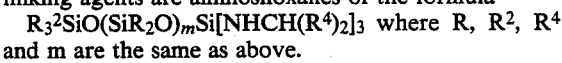

and m are the same as above.

These crosslinking agents may be prepared, for example, by reacting halosilanes with a sec-butylamine. These secondary butylamine crosslinking agents and their method of preparation are described in U.S. Pat. No. 3,923,736 to Nitzsche et al, which is incorporated herein by reference.

The silicon valences of the amine substituted silicon compounds which are not satisfied by the $-NCH(R^4)_2$ groups are preferably satisfied by monovalent hydrocarbon radicals, cyanoalkyl radicals, Si-bonded hydroxyl groups and/or siloxane oxygen atoms.

The amine-substituted organosilicon compounds are employed in amounts which will provide at least one gram equivalent silicon atom of the amine substituted organosilicon compound per gram equivalent of reactive groups on the organopolysiloxane. Generally from about 0.2 to 40 parts by weight of amine substituted organosilicon compound is added for each 100 parts by weight of the organopolysiloxane containing reactive groups.

In addition to the organopolysiloxane polymer and amine-substituted organosilicon compound, the composition also contains alumina trihydrate, which has been treated to impart hydrophobic properties thereto. Preferably, the alumina trihydrate has a specific surface area in the range of from about 1 to 20 m²/g and more preferably from about 2 to 15 m²/g. The average particle size ranges from about 2 to 10 microns and more preferably from about 2 to 5 microns. Preferably, about 97 percent of the alumina trihydrate has a particle size of less than about 10 microns.

Generally, the alumina trihydrate is present in an amount of from about 40 to 75 percent by weight and more preferably from about 50 to 70 percent by weight based on the weight of the organopolysiloxane polymer and the alumina trihydrate.

Any organosilicon compound capable of imparting hydrophobic properties to inorganic substances may be used to treat the alumina trihydrate of this invention. Organosilicon compounds which may be employed to treat the alumina trihydrate are those having the general formula $$(R_3Si)_aZ \text{ or } R_{a'}SiZ'_{4-a'}$$

wherein R which may be the same or different represents monovalent hydrocarbon radicals and halogenated monovalent hydrocarbon radicals having up to 18 carbon atoms, Z and Z' represent halogen, hydrogen or a radical of the formula $-OH$, $-OR^4$, $NX_2$, $-NR^4X$, $-ONR^4$, or $-OOCR^4$ and when a is 2, then Z may also represent $-O-$ or $-NX-$; $R^4$ is a monovalent hydrocarbon radical having up to 18 carbon atoms and more preferably $R^4$ is an alkyl radical having from 1 to 4 carbon atoms; X is hydrogen or has the same meaning as $R^4$, a is 1 or 2 and a' is 1, 2 or 3. Other organosilicon compounds which may be employed are octamethycyclotetrasiloxane and/or dimethylpolysiloxanes having from 2 to 12 siloxane units per molecule in which the dimethylpolysiloxanes have an Sibonded hydroxyl group in each of their terminal units.

The monovalent and halogenated monovalent hydrocarbon radicals represented by R in the organosilicon compounds may be the same as the R radicals linked to the diorganopolysiloxanes. Suitable monovalent hydrocarbon radicals having from 1 to 18 carbon atoms are alkyl radicals, cycloalkyl radicals, alkenyl radicals, aryl radicals, alkaryl radicals, aralkyl radicals and halogenated derivatives thereof.

Examples of halogen atoms represented by Z and Z' are chlorine, bromine and iodine, with chlorine being the preferred example, since it is readily available.

Preferred examples of hydrocarbon radicals represented by $R^4$ are the methyl, ethyl, propyl and butyl radicals. Additional examples of hydrocarbon radicals represented by $R^4$ are described in the following examples of organosilicon compounds which impart hydrophobic properties to alumina trihydrate.

Suitable examples of organosilicon compounds which may be employed to impart hydrophobic properties to alumina trihydrate are hexamethyldisilazane, vinyltriethoxysilane, vinyltrimethoxysilane, trimethylethoxysilane, trimethylaminosilane, trimethylchlorosilane, dimethyldiethoxysilane, trimethylsilylisopropylamine, trimethylsilylethylamine, phenyldimethylsilylpropylamine, vinyldimethylsilylbutylamine, diethylaminoxytrimethylsilane, diethylaminoxyphenyldimethylsilane, hexamethyldisiloxane, 1,3-divinyltetramethyldisiloxane, 1,3-diphenyltetramethyldisilazane, dimethyldichlorosilane, dimethyldimethoxysilane, diphenyldiethoxysilane, vinylmethyldimethoxysilane, and methyltriethoxysilane.

It is preferred that the organosilicon compound used to treat the alumina trihydrate be a vinyltrialkoxysilane having 1 to 2 carbon atoms per alkoxy group because they do not release any by-products which may have a detrimental effect on the dispersions of this invention.

Mixtures of various organosilicon compounds may also be employed in the treatment of alumina trihydrate to impart hydrophobic properties thereto.

It is preferred that the amount of organosilicon compounds used in the surface treatment of the alumina trihydrate be from about 0.1 to 10 percent by weight based on the weight of the alumina trihydrate.

The alumina trihydrate can be reacted with the organosilicon compounds by any conventional technique known in the art for reacting inorganic substances which are solid at room temperature.

Also, it is possible to react the alumina trihydrate with hydrophobic imparting organosilicon compounds which evaporate at room temperature at 760mm Hg (abs.), in a sealed container, such as, for example, a polyethylene bag, for a period of time under ambient conditions. In addition, the alumina trihydrate can be mixed in a mechanical mixing device with a liquid hydrophobic imparting organosilicon compound or in a fluidized bed, and if desired, in the presence of a stream of inert gas.

The reaction of the alumina trihydrate with the organosilicon compound can be accelerated by using catalysts such as ammonia or amines at the rate of from about 0.3 to 3 percent by weight based on the weight of the alumina trihydrate.

The compositions of this invention may be prepared by mixing the various ingredients in any order desired; however, the mixture should be prepared in an atmosphere which is substantially free of water.

In addition to the organopolysiloxane polymer, the amine-substituted organosilicon compound and the treated alumina trihydrate, the compositions of this invention may also contain additives such as compression-set additives, pigments, soluble dyes, aromatics (essential oils), oxidation inhibitors, heat stabilizers, flame retardants and light stabilizers, plasticizers and softeners such as trimethylsiloxy endblocked dimethylpolysiloxane fluids, reinforcing fillers and non-reinforcing fillers.

Examples of reinforcing fillers and non-reinforcing fillers are quartz, diatomaceous earth, calcium silicate, zirconium silicate, so-called "molecular sieves", metal oxide powers, such as titania, alumina, iron oxide, zinc oxide and calcium carbonate. Fibrous fillers, for example, asbestos, glass fibers or organic fibers can also be used.

The fillers can advantageously be treated by known methods to include organosiloxy or alkoxy groups on their surface. Mixtures of different fillers may be added to the compositions of this invention. The amount of filler may vary over a broad range, preferably from 0 to 90 percent by weight, based on the total weight of the organopolysiloxane and filler; however, the amount of filler should not be so great as to degrade the arc resistance or current leakage supression of the elastomeric coating.

Other additives which may be employed in the compositions of this invention are condensation catalysts such as those disclosed in, for example, U.S. Pat. Nos. 2,843,555; 2,127,363; and 3,082,527. Examples of suitable condensation catalysts are metallic salts and organometallic salts of carboxylic acids, such as lead octoate, dibutyltin dilaurate and dibutyltin salts of aliphatic carboxylic acids which are branched in the alpha-position to the carboxyl groups and have from 9 to 11 carbon atoms, amines, such as 3-ethoxypropylamine-1, and silanes which have at least one amine group bonded via carbon to silicon and at least one monovalent hydrocarbon radical or a hydrocarbon radical substituted by an amine group and/or alkoxy group, and bonded via oxygen to silicon in each molecule. Silanes of the latter, which not only act as condensation catalysts but as adhesion promoters for improving the adhesion of the elastomers to the substrates, are N-beta-(aminoethyl)-gammaaminopropyltrimethoxysilane or a compound of the formula $$CH_3Si[O(CH_2)_2NH_2]_2(CH_2)_3O(CH_2)_2NH_2$$

If condensation catalysts are used, they are generally employed in amounts of from 0.01 to 5 percent by weight and more preferably from about 0.05 to 1 percent by weight, based on the total weight of the composition.

When adhesion promoters are employed in the compositions, the amount may range from about 0.2 to about 2 percent of weight, based on the weight of the organopolysiloxane and alumina trihydrate.

The compositions of this invention are preferably prepared by mixing the treated alumina trihydrate with the deaired. The amine-substituted organosilicon crosslinking agent and catalyst, if used, is then added to the mixture under anhydrous conditions.

The compositions of this invention may be stored for long periods of time anhydrous conditions without deleterious effects and then crosslinked by merely exposing them to atmospheric moisture at room temperature.

The compositions of the present invention are especially useful for coating high voltage apparatus where it is essential that a component be insulated from the surrounding. elements.

High voltage insulators may be coated with the compositions of this invention by conventional methods, such as spraying, dipping or brushing. Generally, the compositions are dispersed in a non-reactive solvent for ease of application. Examples of non-reactive solvents which may be employed are hydrocarbon solvents such as toluene, xylene, naphtha and chlorinated hydrocarbon solvents such as chlorothene. Preferred solvents are chlorothene and V.M.&P naphtha. By dispersing the composition in a solvent, the viscosity can be reduced so that it can be applied to the insulator surface by spraying, dipping or brushing.

The amount of non-reactive solvent is not critical and may range up to about 80 percent by weight, based on the weight of the composition.

The coatings of this invention may be crosslinked by exposing the coating to atmospheric moisture. Crosslinking may be accelerated by applying heat or by adding water in addition to that contained in the atmosphere or by the addition of carbon dioxide.

The coating preferably ranges from about 0.2 to abouta 2 mm in thickness. A coating thickness above about 2 mm may be applied to the insulators, if desired. It has beed found that a thicker coating may be more resistant to arcing than thinner coatings, such as those having a thickness of less than about 0.2 mm.

An advantage of the present invention is that a coated insulator can be manufactured in place. Insulators such as ceramic suspension insulators, strings, ceramic post insulators, composite suspension insulators, filled-resin post insulators and cable terminations can be coated in the field by applying the compositions of this invention on the surfaces of the insulators and thereafter exposing the coated surface to atmospheric moisture to crosslink the same. The resultant coating forms a hydrophobic arc-resistant surface. Also, insulators may be sprayed on line and the line re-energized while the coating dries and cures in the presence of atmospheric moisture.

These compositions are useful in a number of applications where it is necessary to resist erosion and/or control current leakage, and are especially useful in electrical components exposed to voltages above 1 kV. The compositions may be used in electrical power transmission and distribution systems, as for example, insulator materials for high voltage components, as insulators for cable terminations, fuse covers, transformer covers and as insulation coatings.

Surprisingly, it was found that the use of alumina trihydrate treated with a hydrophobic agent provided an elastomer having an improved contact angle. It has been shown heretofore that there is a close correlation between the hydrophobic nature of the surface as measured by contact angle with water and the electrical performance of the elastomer.

In the following examples all parts are by weight unless otherwise specified.

EXAMPLE 1

To a mixer containing 100 parts of a hydroxylterminated dimethylpolysiloxane having a viscosity of 20,000 mPa.s to 25° C. are added 150 parts of treated alumina trihydrate consisting of 64.9 percent $Al_2O_3$, 0.02 percent $SiO_2$, 0.02 percent $Fe_2O_3$, 0.35 p $Na_2O$ and having a specific gravity of 2.42 (available from Solem Industries, Inc. as SP-632) and mixed for about 20 minutes under a nitrogen atmosphere. Then about 82 parts of chlorothene are added to the mixture and mixed for about 10 minutes to form a dispersion. About 10 parts of methyltris-(cyclohexylamino)silane and 0.8 parts of qamma-aminopropyltrimethhoxysilane are then added to the dispersion and mixed for about 20 minutes under a nitrogen atmosphere. The resultant dispersion is molded to form test specimens and exposed to atmospheric moisture for 7 days. The skin-over time is 6 mintues and the tack-free is time 11 minutes. The physical properties are determined after curing for 7 days in atmospheric moisture.

| Physical Properties | |
| --- | --- |
| Durometer, Shore A | 55 |
| Tensile strength, psi | 300 |
| Elongation percent | 125 |
| Tear | 30 |

The arc resistance of a cured sample is determined in accordance with ASTM D-495-73.

| | |
| --- | --- |
| Arc resistance to failure | >420 seconds |

-continued

Contact angle measurement.

The contact angle is measured by the sessile drop technique in which drops of water about 2 mm in diameter are applied from a syringe to the surface of the sample after it has cured for 7 days. The contact angle is measured about 30 seconds after applying the water using a telescope fitted with a goniometer eyepiece.

Contact angle of the cured sample is 103°.

COMPARISON EXAMPLE

The procedure of Example 1 is repeated, except that 150 parts of an untreated alumina trihydrate consisting of 64.9 percent $Al_2O_3$, 0.02 percent $SiO_2$, 0.02 percent $Fe_2O_3$, 0.35 p $Na_2O$ and having a specific gravity of 2.42 (available from Solem Industries, Inc. as SB-632) is substituted for the treated alumina trihydrate. The resultant mixture is formed into test specimens and exposed to atmospheric moisture. The skin-over time is 11 minutes and the tack-free time is 18 minutes. After curing for 7 days in atmospheric moisture, the physical properties are determined.

| Physial Properties | |
|---|---|
| Durometer, Shore A | 50 |
| Tensile, psi | 240 |
| Elongation, percent | 150 |
| Tear | 30 |

The contact angle, which is measured in accordance with the procedure described in Example 1, is 90°.

EXAMPLE 2

The procedure of Example 1 is repeated, except that 67 parts of treated alumina trihydrate is substituted for 150 parts of treated alumina trihydrate. The resultant composition exhibited good arc resistance.

EXAMPLE 3

The procedure of Example 1 is repeated, except that 300 parts of treated aluminum trihydrate is substituted for 150 parts of treated aluminum trihydrate. The arc resistance of the resultant composition before failure is greater than 420 seconds.

EXAMPLE 4

The solvent dispersion prepared in accordance with the procedure of Example 1 is applied to the surface of a ceramic insulator as a uniform coating about 1 mm in thickness and cured by exposure to atmospheric moisture. The resultant coating provides a hydrophobic and arc resistant surface which shows excellent adhesion to the insulator surface.

EXAMPLE 5

The procedure of Example 1 is repeated, except that 10 parts of each of the following crosslinking agents are substituted for 10 parts of methyltris(cyclohexylamino)silane in the above composition: Methyltris(ethylamino)silane, methyltris(phenylamino)silane, methyltris(n-heptylamino)silane, phenyltris(3,5,5-trimethylcyclohexylamino)silane, methyltris(sec-butylamino)silane, tetrakis(n-butylamino)silane, phenyltris(dimethylamino)silane, hexyltris(nbutylamino)silane, ethyltris(methylhexylamino)silane, vinyltris(phenylamino)silane and a mixture containing 30 percent by weight dimethylbis(cyclohexylamino)silane and 70 percent by weight of vinyltris(n-propylamino)silane, based on the weight of the mixture of crosslinking agents. The resultant compositions cured at room temperature of from elastomers having excellent arc resistant properties.

What is claimed is:

1. A room temperature vulcanizable composition which is stable in the absence of moisture, but when exposed to atmospheric moisture crosslinks to form an elastomer having improved electrical properties comprising an organopolysiloxane having terminal reactive groups selected from the group consisting of alkoxy, aryloxy and hydroxyl groups, an amino-substituted organosilicon crosslinking agent capable of reacting with the organopolysiloxane terminal reactive groups in the presence of moisture and having an average of at least two $-NR_2^1$ groups per molecule linked to silicon in an amount of at least one gram equivalent silicon atom of the amine-substituted organosilicon compound per gram equivalent of reactive groups on the organopolysiloxane, where $R^1$ is selected from the group consisting of a monovalent hydrocarbon radical having up to 18 carbon atoms and hydrogen, and an alumina trihydrate which has been treated with an organosilicon compound to impart hydrophobic properties thereto, in which the treated alumina trihydrate is present in the composition in an amount of from 40 to 75 percent by weight based on the weight of the organopolysiloxane and the alumina trihydrate.

2. The composition of claim 1, wherein the organopolysiloxane contains terminal hydroxyl groups.

3. The composition of claim 1, wherein the amine-substituted organosilicon crosslinking agent is selected from the group consisting of an aminosilane of the formula $$R_{4-z}^2 Si(NR^1)_z$$

where $R^1$ is selected from the group consisting of a monovalent hydrocarbon radical having from 1 to 18 carbon atoms and hydrogen, $R^2$ is a monovalent hydrocarbon radical having from 1 to 18 carbon atoms and z has an average value of from 2 to 4 and partial hydrolyzates thereof.

4. The composition of claim 3, wherein the aminosilane is methyltris-(cyclohexylamino)silane.

5. The composition of claim 1, wherein the treated alumina trihydrate has an average particle size of from 2 to 10 microns.

6. The composition of claim 1, wherein the composition is dispersed in a non-reactive organic solvent.

7. The composition of claim 1, wherein the composition contains an adhesion promoter.

8. A method for coating an electrical insulator having improved electrical properties, which comprises coating an insulator with a composition dispersed in a non-reactive solvent containing an organopolysiloxane having terminal reactive groups selected from the group consisting of alkoxy, aryloxy and hydroxyl groups, an amino-substituted organosilicon crosslinking agent having an average of at least two $-NR_2^1$ groups per molecule linked to silicon in an amount of at least one gram equivalent silicon atom of amine-substituted organosilicon compound per gram equivalent of terminal reactive groups on the organopolysiloxane, where $R^1$ is selected from the group consisting of a monovalent hydrocarbon radical having up to 18 carbon atoms and hydrogen and an alumina trihydrate which has been treated with an organosilicon compound to impart hydrophobic properties thereto, in which the treated alumina trihydrate is present in the composition in an amount of from 40 to 75 percent by weight, based on the weight of the organopolysiloxane and the alumina trihydrate and thereafter exposing the coated insulator to atmospheric moisture.

9. The method of claim 8, wherein the insulator is a ceramic insulator.

10. The method of claim 8, wherein the insulator is a plastic insulator.

11. The method of claim 8, wherein the organopolysiloxane contains terminal hydroxyl groups.

12. The method of claim 8, wherein the amine-substituted organosilicon crosslinking agent is selected from the group consisting of an aminosilane of the formula $R_{4-z}^{2}Si(NR^{1})_{z}$ where $R^1$ is selected from the group consisting of a monovalent hydrocarbon radical having from 1 to 18 carbon atoms and hydrogen, $R^2$ is a monovalent hydrocarbon radical having from 1 to 18 carbon atoms and z has an average value of from 2 to 4 and partial hydrolyzates thereof.

13. The method of claim 12, wherein the aminosilane is methyltris-(cyclohexylamino)silane.

14. The method of claim 8, wherein the treated alumina trihydrate has an average particle size of from 2 to 10 microns.

15. The method of claim 8, wherein the nonreactive solvent is a chlorinated hydrocarbon.

16. The coated insulator obtained from the method of claim 8.

* * * * *